United States Patent [19]

Sheely, Jr. et al.

[11] 4,099,565
[45] Jul. 11, 1978

[54] SINGLE WELL TRACER METHOD TO EVALUATE ENHANCED RECOVERY

[75] Inventors: Clyde Q. Sheely, Jr.; David E. Baldwin, Jr., both of Ponca City, Okla.

[73] Assignee: Continental Oil Company, Ponca City, Okla.

[21] Appl. No.: 778,920

[22] Filed: Mar. 18, 1977

[51] Int. Cl.² ............................................. E21B 43/22
[52] U.S. Cl. ................................................... 166/252
[58] Field of Search ........................ 166/250, 252, 273

[56] References Cited

U.S. PATENT DOCUMENTS

| Re. 28,963 | 9/1976 | Fertl et al. | 166/252 |
|---|---|---|---|
| 3,590,923 | 7/1971 | Cooke, Jr. | 166/252 |
| 3,623,842 | 11/1971 | Deans | 166/252 X |
| 3,856,468 | 12/1974 | Keller | 166/252 X |
| 3,894,584 | 7/1975 | Fertl | 166/252 X |
| 3,990,298 | 11/1976 | Deans | 166/252 X |

Primary Examiner—Stephen J. Novosad
Assistant Examiner—George A. Suchfield
Attorney, Agent, or Firm—A. Joe Reinert

[57] ABSTRACT

Data useful to evaluate the effectiveness of or to design an enhanced recovery process (the recovery process involving mobilizing and moving hydrocarbons through a hydrocarbon-bearing subterranean formation from an injection well to a production well by injecting a mobilizing fluid into the injection well) are obtained by a process which comprises sequentially: determining hydrocarbon saturation in the formation in a volume in the formation near a well bore penetrating the formation, injecting sufficient of the mobilizing fluid to mobilize and move hydrocarbons from a volume in the formation near the well bore penetrating the formation, and determining by the single well tracer method a hydrocarbon saturation profile in a volume from which hydrocarbons are moved. The single well tracer method employed is disclosed by U.S. Pat. No. 3,623,842. The process is useful to evaluate surfactant floods, water floods, polymer floods, $CO_2$ floods, caustic floods, micellar floods, and the like in the reservoir in much less time at greatly reduced costs, compared to conventional multi-well pilot test.

14 Claims, 4 Drawing Figures

SINGLE WELL TRACER METHOD TO EVALUATE ENHANCED RECOVERY

BACKGROUND OF THE INVENTION

1. Field of the Invention

The invention relates to evaluation and/or design of flooding processes for enhanced oil recovery.

2. Brief Description of the Prior Art

A great need exists to recover additional hydrocarbons from subterranean formations after primary production is no longer economical. Recovery processes involving mobilizing and moving hydrocarbons through a hydrocarbon-bearing subterranean formation from an injection well to a production well by injecting a mobilizing fluid into the injection well are well known. For example, water flooding is widely practiced all over the world. A large amount of funds and effort are now also being expended in developing and demonstrating surfactant floods, polymer floods, steam floods, micellar floods, $CO_2$ floods, and the like.

One of the factors inhibiting more rapid development of such enhanced recovery methods, particularly surfactant flooding, polymer flooding, micellar flooding, and the like, is the tailoring of a process to a reservoir. Hydrocarbon-bearing reservoirs are each unique and can respond in many unexpected and unpredictable ways to application of such complex processes. Particularly, applications of surfactant systems are unpredictable because so many parameters can influence the surfactant systems.

Present practice is to use all of the knowledge available including laboratory data and reservoir properties to design a best evulation of what will be technically feasible and cost effective in the reservoir, and then to conduct a pilot project for each reservoir to prove out or redesign the flood process.

A major problem with this approach is that pilot projects are quite expensive and take an extended time. For example, a pilot project to evaluate a surfactant or polymer flood can be expected to cost at least $3 million. To illustrate, BERC-76/4, October 1976 Progress Review No. 8, Contracts and Grants for cooperative research on Enhancement of Recovery of Oil and Gas, and other current references, disclose that the ERDA supported project in the El Dorado field had an original estimated cost of over $7 million, the project in the Burbank field had an estimated cost of almost $10 million, the Bell Creek field over $5 million, the Bradford field over $4 million, and the North Stanley field almost $4 million. Many larger companies are also independently conducting pilots having costs of this order of magnitude. Obviously, only the expectation of considerable hydrocarbon recovery can justify such front-end risk expense. The time involved for such evaluation normally extends over a number of years. Thus only the larger reservoirs are evaluated, and only organizations with considerable risk capital can afford to evaluate such processes.

Clearly, a great need exists for a less expensive and a more rapid method of field evaluating and tailoring such flooding processes in particular reservoirs. The single well tracer method employed in the process of this invention is disclosed in U.S. 3,623,842. This patent forms the basis of a license package of a method for determining hydrocarbon saturation in subterranean reservoirs, and along with related know-how and software has been widely licensed in the industry by Exxon Co., Houston, Texas. This patent is incorporated by reference. Supplemental disclosure is found in: U.S. Pat. No. 3,590,923; Clyde Q. Sheely, Description of Field Tests to Determine Residual Oil Saturation by Single Well Tracer Method, SPE paper 5840, Prepared for the Improved Oil Recovery Symposium of the Society of Petroleum Engineers of AIME, held in Tulsa, Okla., March 22-24, 1976; J. F. Tomick, et. al., Single-Well Tracer Method to Measure Residual Oil Saturation, Journal of Petroleum Technology, February, 1973, pp. 211-218. Such disclosures are also incorporated by reference.

Our invention constitutes a substantial advance in the art by providing for efficient acquisition of data useful to evaluate the effectiveness of or to design an enhanced recovery process. Cost is greatly reduced since only one bore hole need be drilled, and the time is also greatly reduced.

OBJECTS OF THE INVENTION

An object of the invention is to provide a process for acquisition of data useful to evaluate the effectivenss of or design an enhanced recovery process.

SUMMARY OF THE INVENTION

Data useful to evaluate the effectiveness of or to design an enhanced recovery process (the recovery process involving mobilizing and moving hydrocarbons through a hydrocarbon-bearing subterranean formation from an injection well to a production well by injecting a mobilizing fluid into the injection well) are obtained by a process which comprises sequentially: determining hydrocarbon saturation in the formation in a volume in the formation near a well bore penetrating the formation, injecting sufficient of the mobilizing fluid to mobilize and move hydrocarbons from a volume in the formation near the well bore penetrating the formation, and determining hydrocarbon saturation by the single well tracer method in a volume from which hydrocarbons are moved.

According to one aspect, the process is useful to evaluate surfactant floods, water floods, polymer floods, $CO_2$ floods, caustic floods, micellar floods, soluble oil floods, microemulsion floods, miscible floods, and the like in a reservoir in much less time at greatly reduced costs than the conventionally used pilot method.

PREFERRED EMBODIMENTS OF THE INVENTION

Figure 1:
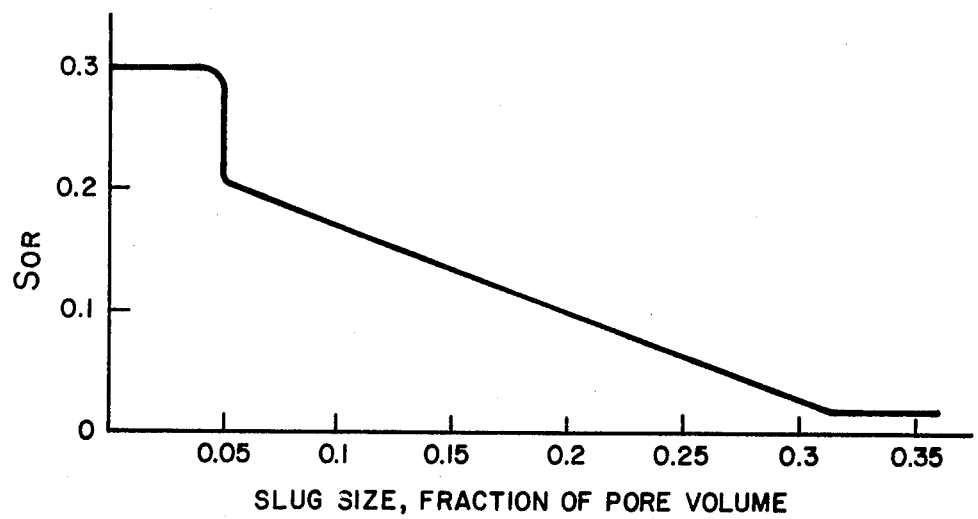
FIG. 1, 2 and 4 illustrate the residual oil saturation profile of a reservoir during treatment by the method of the present invention as a function of slug size and distance from the wellbore.

The process of this invention is useful to obtain data which is useful to evaluate the effectiveness of or to design an enhanced recovery process. The enhanced recovery processes contemplated involve mobilizing and moving hydrocarbons through a hydrocarbon-bearing subterranean formation from an injection well to a production well by injecting a mobilizing fluid into the injection well. The hydrocarbons are produced through a production well. The mobilizing fluid can be water, brine, a micellar solution, an aqueous surfactant containing mixture, a gas comprising $CO_2$, a soluble oil, a microemulsion, a gas comprising air, an aqueous solution containing caustic, or an aqueous liquid thickened with a polymer. Combinations of such methods can also be employed as are also well known to those skilled in the art. For example, a slug of an aqueous liquid which contains a surfactant mixture can be injected into an injection well followed by an aqueous liquid slug thickened with polymer to effect mobility control, which in turn can be followed by injection of water, brine, or the like to mobilize and move the hydrocarbons through the formation to the vicinity of a production well from which the hydrocarbons are produced.

Extremely voluminous literature is available describing the use and application of such enhanced recovery methods.

According to a presently preferred mode, the invention is particularly applicable to evaluation or design of those enhanced recovery processes wherein the aqueous liquid is injected and moved through the reservoir. Its primary value is presently contemplated to be greatest with those processes wherein an aqueous mixture containing a surfactant is injected as a slug followed by a larger slug of water or brine. The surfactant containing mixture can be a micellar solution, a microemulsion, a clear emulsion, surfactant solubilized in water or brine, a soluble oil, or the like. These are the systems which are most difficult to tailor to the myriad of reservoir parameters.

The hydrocarbon saturation determination of the first step of the process of this invention can be by any method known to the art. Thus core data can be obtained and evaluated. Logs of various types can be employed such as neutron activation logs and the like. The log-inject-log method can be employed. Preferably the hydrocarbon saturation in this step is determined by the single well tracer method.

The single well tracer method employed in the third step of this invention and which can be employed in the first step of the invention process is the method disclosed by U.S. 3,623,842 as supplemented by the auxiliary references cited.

According to one presently preferred mode, the single well tracer method employed comprises a method for determining the relative amounts of two fluid phases in a subterranean reservoir formation wherein one of the phases is mobile and the other is essentially immobile which comprises injecting into the formation a carrier fluid - reaction solution, said carrier fluid being substantially insoluble in the immobile and miscible with the mobile fluid phase, said reactant being capable of forming within the formation at least two tracers which have different partition coefficients between the carrier fluid and the mobile phase, the concentration of the reactant in the carrier fluid and the reactivity of the reactant being sufficiently great to enable detection of two of said tracers, displacing the carrier fluid - tracer solution formed within the formation through the formation, detecting said two tracers following said displacement, and measuring a chromatographic property related to one of said two tracers and a chromatographic property related to the other of said two tracers to determine the relative amounts of the two fluid phases in the formation.

According to another presently preferred mode, the reactant is a hydrolyzable ester, the tracers are unreacted ester and alcohol formed by hydrolysis of the ester, and the carrier fluid - reactant solution is injected at a location in the well and is withdrawn from the same location in the well. Examples of particularly suitable tracer pairs for many situations are unreacted ethyl acetate and ethanol; n-propyl formate, n-propyl alcohol; and ethyl formate, ethyl alcohol.

EXAMPLES

These examples are provided in order to more fully explain the present invention and provide information to those skilled in the art on how to carry it out. However, it is to be understood that these examples are not intended to function as limitations on the invention as described and claimed herein.

To exemplify an embodiment of the invention, a watered out hydrocarbon containing formation is vertically traversed by a well bore. A single well tracer test according to the method of U.S. Pat. No. 3,623,842 is run on the watered out hydrocarbon containing formation to determine the residual oil saturation left in the formation after the waterflooding operation which resulted in the watered out condition. The single well tracer test is designed such that it "sees" the residual oil saturation from the bore hole outward for a volume of 50 bbl/ft of pay or for an average of about 15–20 feet with a formation having 20 feet of pay and a partition coefficient of 3.0.

Thereupon, a small slug of surfactant-containing solution is prepared. The surfactant-containing solution is designed according to the best information available and comprises a sodium hydrocarbon sulfonate blend having the most economical oil mobilizing and moving properties available for a reasonable expenditure, plus a sodium sulfated ethoxylated alcohol to impart hardness tolerance, plus an overbasing amount of sodim hydroxide. A small slug of the surfactant mixture is sized according to the best data available such that it will be expected to begin losing its effectiveness after traversing about ten times its volume from the well bore. A mini slug of about 50 bbl. of surfactant solution is injected followed by a slug of aqueous liquid containing polymer produced by fermentation with Xanthomonous campestris sufficient to effect mobility control. Sufficient reservoir brine is then injected to move the surfactant slug and the polymer slug back into the reservoir for a volume of about 5,000 bbl.

Thereupon, tracer tests are repeated to sense the volume of about 300 bbl. from the well bore, and it is determined that virtually all of the residual oil has been mobilized from this locus and moved back into the formation by the injected fluids.

Thereupon, another single well tracer test is employed to sense the formation for a volume of 600 bbl. out from the well bore. From these data it is determined that an average of about 75 percent of the residual oil has been removed from this volume by the flooding process.

Yet another single well tracer test is employed to sense the reservoir for a volume of 1000 bbl. from the well bore. From these data, it is determined that only about an average of 50 percent of the residual oil is removed by the flooding procedure.

These data are useful to evaluate the effect of surfactant slug size on the oil displacement, and in this exemplary application confirm that the flood design is near optimum for the most effective and efficient recovery. From these data, a full-scale flood design is finalized without the necessity of going through the expensive and time-consuming piloting stage. It is determined that the procedure provides data having an equivalent value to a pilot run at about one-tenth of the cost and at a time savings of about 2 years.

The process of the invention is also very useful to obtain data useful to design a full-scale field recovery after a pilot has been run. In one aspect data useful to evaluate different slug sizes and formulations from those employed in the pilot are obtained. Optimization can readily be effected from the data obtained.

Additional exemplification of the application of the process follows. Calculations for obtaining a profile of the well saturation away from the well are included. The graph of FIG. 1 obtained by flooding a core with surfactant slug in laboratory serves as a basis for these exemplary calculations.

An initial residual oil saturation of 0.3, a porosity of 0.20, and a partition coefficient of 6.3 are presumed. The partition coefficient is defined as concentration of tracer in the oil phase divided by the concentration in the water phase at equilibrium. A surfactant slug size is chosen to be 10 percent of the volume contacted by the tracer which is injected in a single well test with a total volume of 90 barrels per foot of net effective pay reservoir. These starting conditions are exemplary of a suitable range for an example of the test.

Figure 2:
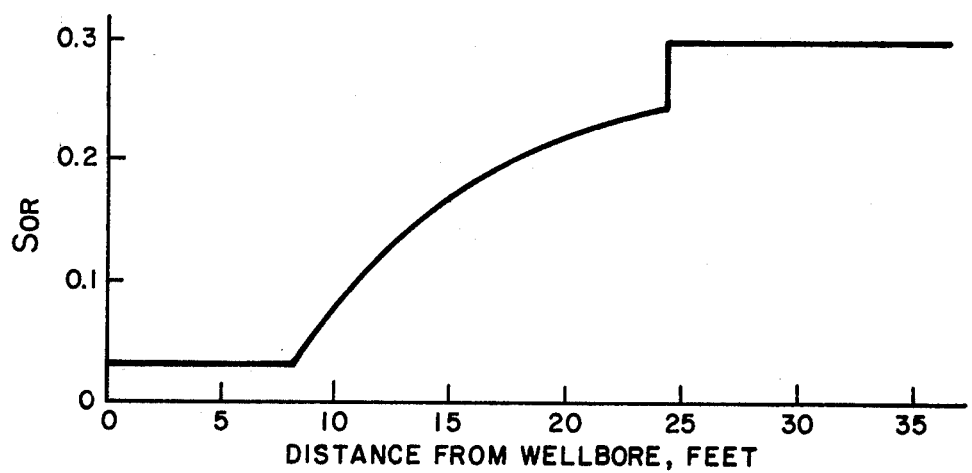

Using the above conditions, a curve of oil saturation as a function of distance from the well is calculated as exemplified in FIG. 2. A series of calculations is carried out to determine the average oil saturation that will be measured by a single well tracer test of a particular total injected volume. Another series of calculations can be carried out that will demonstrate that a reasonable estimation of the starting oil saturation profile can be obtained.

The calculations can be performed by first calculating the volumes contacted for a series of distances from the well bore. In this example, distances at 1 foot intervals are used. A retardation factor is calculated at the mid point of each interval by:

$$R.F. = \frac{1}{1 + \frac{KS_{or}}{1 - S_{or}}} \quad (1)$$

Where K is the previously defined partition coefficient and $S_{or}$ is the residual oil saturation as a fraction of pore volume. A delta injected volume is calculated for the interval by $$\Delta V_{inj} = \frac{\Delta V_{cont.}}{R.F.} \quad (2)$$

where $\Delta V_{cont.}$ is the delta volume contacted by the partitioning tracer. For each distance a cumulative volume is calculated by summing up all the $\Delta V_{inj}$s to correspond with the cumulative contacted volume. An average retardation factor is calculated by $$\overline{R.F.} = \frac{V_{cont.}}{V_{inj.}} \text{ cum} \quad (3)$$

The average residual oil saturation over the same cumulative volumes is calculated by solving equation (1) for $S_{or}$ thus:

$$\overline{S_{or}} = \frac{[1 - \overline{R.F.}]}{[1 + \overline{R.F.}(K - 1)]} \quad (4)$$

Figure 3:
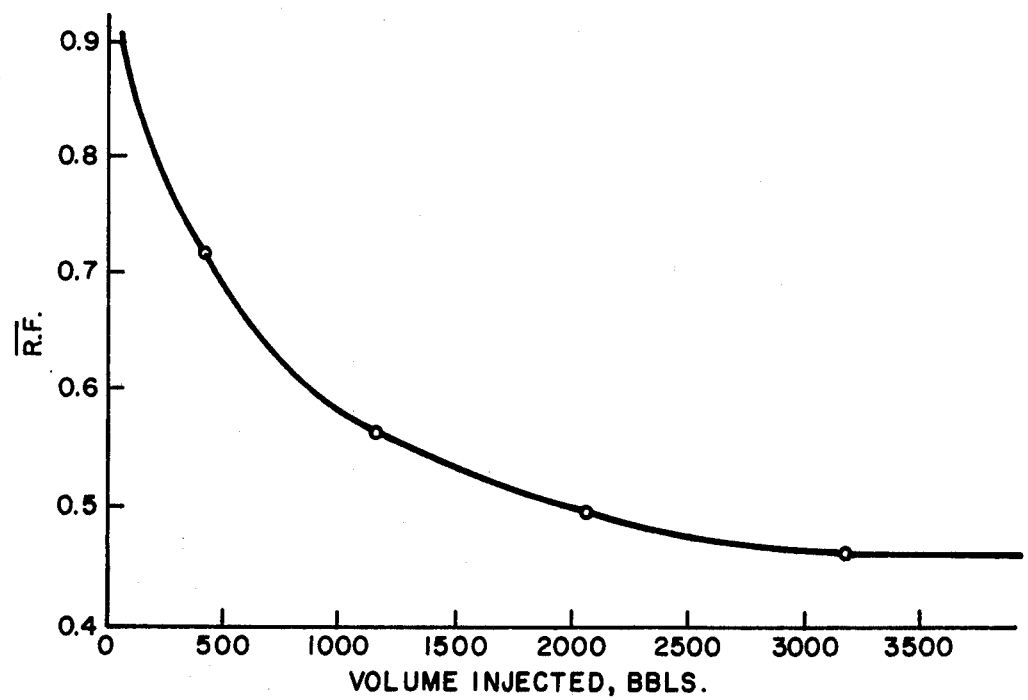
FIG. 3 illustrates the average retardation factor profile of a reservoir as a function of distance from the wellbore.

When the test is performed in the field, several average residual oil saturations, $S_{or}$, will be obtained at several different volumes over a range that will hopefully define the residual oil saturation profile. To demonstrate a method for the reverse of the above calculations, four different average residual oil saturations are plotted and a smooth curve is drawn through the point as illustrated in FIG. 3.

Using the average retardation factor for each increment of cumulative injected volume, the cumulative contacted volume, the delta injection volume, and the delta contacted volume are calculated. The retardation factor for the interval, which approximates the point retardation factor can be used to calculate the point residual oil saturation by $$S_{or} = (1 - R.F.)/[1 + R.F.(K - 1)]$$

Figure 4:
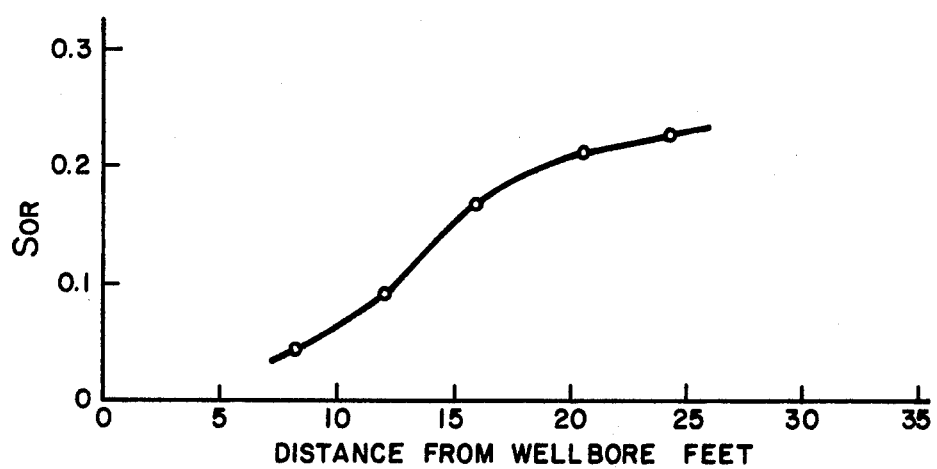

The resultant profile as shown in FIG. 4 is generated and can be compared to FIG. 2.

Thus, the data obtained according to the process of the invention are useful to evaluate the effectiveness of or to design or redesign an enhanced recovery process. Of course, a digital or analog computer can be employed as a tool in the resulting designing. Such use of the data is within the skill of chemists and engineers skilled in the art, and is not within the scope of the process claimed.

We claim:

1. A process for obtaining data useful to evaluate the effectiveness of or to design an enhanced recovery process, the recovery process involving mobilizing and moving hydrocarbons through a hydrocarbon-bearing subterranean formation from an injection well to a production well by injecting a mobilizing fluid into the injection well, comprising sequentially:
    (a) determining hydrocarbon saturation in the formation in a volume in the formation near a well bore penetrating the formation,
    (b) injecting sufficient of the mobilizing fluid to mobilize and move hydrocarbons from a volume in the formation near the well bore penetrating the formation, and
    (c) determining hydrocarbon saturation in a volume including at least a part of the volume of (b) by a single well tracer method.

2. The process of claim 1 wherein the mobilizing fluid is an aqueous solution and wherein the determination of step (a) is by a single well tracer method.

3. The process of claim 2 wherein the mobilizing fluid comprises an aqueous liquid containing a surfactant.

4. The process of claim 3 wherein the hydrocarbons are mobilized and moved in step (b) by injecting a slug of aqueous liquid containing a surfactant followed by a slug of aqueous liquid sufficient to move the mobilized hydrocarbons beyond the volume sensed by the single well tracer method in step (c).

5. The process of claim 4 wherein the single well tracer method employed in step (a) and step (c) comprises a method for determining the relative amounts of two fluid phases in a subterranean reservoir formation wherein one of the phases is mobile and the other is essential immobile which comprises injecting into the formation a carrier fluid-reactant solution, said carrier fluid being substantially insoluble in the immobile fluid phase and miscible with the mobile fluid phase, said reactant being capable of forming within the formation at least two tracers which have different partition coefficients between the carrier fluid and immobile phase, the concentration of the reactant in the carrier fluid and the reactivity of the reactant being sufficiently great to enable detection of two of said tracers, displacing the carrier fluid-tracer solution formed within the formation through the formation, detecting said two tracers following said displacement, and measuring a chromatographic property related to one of said two tracers and a chromatographic property related to the other of said two tracers to determine the relative amounts of the two fluid phases in the formation.

6. The process of claim 5 wherein the carrier fluid is an aqueous liquid, wherein the reactant is a hydrolyzible ester, wherein the tracers are unreacted ester and the alcohol formed by hydrolysis of the ester, and wherein the carrier fluid-reactant solution is injected at a location in a well and is withdrawn from the same location at the same well.

7. The process of claim 6 wherein the tracers are unreacted ethyl acetate and ethanol.

8. The process of claim 6 wherein the slug of aqueous liquid containing a surfactant injected in step (b) is followed by a slug of aqueous liquid thickened with a polymer to effect mobility control.

9. The process of claim 6 wherein the aqueous liquid contaning a surfactant is sized such that its mobilizing and moving effect will be diminished within the radial sensing volume reachable by the single well tracer method employed in step (c), of claim 1, and wherein at least one single well tracer determination is made subsequent to step (c) to determine hydrocarbon saturation in a volume near the well bore and in at least one volume reaching a radial distance from the well bore, such as to obtain data relating to declining effectiveness of the mobilizing effect of the surfactant containing slug.

10. The process of claim 9 wherein the surfactant comprises a hydrocarbon sulfonate.

11. The process of claim 9 wherein the surfactant containing slug is a micellar solution and wherein the surfactant containing slug contains a hydrocarbon sulfonate, a sulfated alkoxylated linear alcohol, and a basic material.

12. The process of claim 9 wherein the surfactant containing slug contains an anionic surfactant and a nonionic surfactant and wherein the polymer in the polymer thickened slug is a biopolymer produced by fermentation with Xanthomonas campestris.

13. The process of claim 9 wherein at least two single well tracer determinations are made subsequent to step (c).

14. The process of claim 13 wherein data sufficient to plot a hydrocarbon saturation profile are obtained.

* * * * *